(12) United States Patent
Wang et al.

(10) Patent No.: US 10,419,166 B2
(45) Date of Patent: Sep. 17, 2019

(54) METHOD AND DEVICE FOR DATA RETRANSMISSION

(71) Applicant: Huawei Technologies Co., Ltd., Shenzhen (CN)

(72) Inventors: Da Wang, Beijing (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/565,356

(22) PCT Filed: Apr. 9, 2015

(86) PCT No.: PCT/CN2015/076174
§ 371 (c)(1),
(2) Date: Oct. 9, 2017

(87) PCT Pub. No.: WO2016/161601
PCT Pub. Date: Oct. 13, 2016

(65) Prior Publication Data
US 2018/0109359 A1 Apr. 19, 2018

(51) Int. Cl.
*H04L 1/18* (2006.01)
*H04L 5/00* (2006.01)
*H04W 72/04* (2009.01)

(52) U.S. Cl.
CPC .......... *H04L 1/1812* (2013.01); *H04L 1/1887* (2013.01); *H04L 5/0053* (2013.01); *H04W 72/0446* (2013.01); *H04W 72/042* (2013.01)

(58) Field of Classification Search
CPC ... H04L 1/1812; H04L 1/1887; H04L 5/0053; H04W 72/0446; H04W 72/042
See application file for complete search history.

(56) References Cited

U.S. PATENT DOCUMENTS

2006/0234628 A1   10/2006   Horiguchi et al.
2013/0010740 A1    1/2013   Kim et al.
(Continued)

FOREIGN PATENT DOCUMENTS

CN    101069377 A    11/2007
CN    101379753 A     3/2009
(Continued)

OTHER PUBLICATIONS

"HARQ design for LAA",3GPP TSG RAN WG1 Ad-hoc Meeting Paris, France, XP050951365, R1-151120, 3rd Generation Partnership Project, Valbonne France (Mar. 24-26, 2015).
(Continued)

*Primary Examiner* — Curtis A Alia
(74) *Attorney, Agent, or Firm* — Leydig, Voit & Mayer, Ltd.

(57) ABSTRACT

The present invention discloses a data retransmission method, a device, and a system, and relates to the communications field, so as to resolve a prior-art problem that when a device transmits data by using an unlicensed carrier, the data cannot be retransmitted because a channel needs to be preempted again. A specific solution is as follows: A first device transmits data to a second device by using a first carrier, where the first carrier is an unlicensed carrier. The first device obtains status information of the first carrier, where the status information is used to determine whether the first carrier is available. When the first carrier is unavailable, the first device retransmits the data to the second device by using a second carrier, where the first carrier and the second carrier are different carriers. The present invention is used for data retransmission.

20 Claims, 4 Drawing Sheets

(56) References Cited

U.S. PATENT DOCUMENTS

| | | |
|---|---|---|
| 2014/0036881 A1* | 2/2014 | Kim .................. H04L 5/001 370/336 |
| 2014/0036889 A1 | 2/2014 | Kim et al. |
| 2015/0055589 A1 | 2/2015 | Yerramalli et al. |
| 2015/0289208 A1* | 10/2015 | Liu .................. H04L 1/1887 370/252 |

FOREIGN PATENT DOCUMENTS

| | | |
|---|---|---|
| CN | 101841407 A | 9/2010 |
| JP | 2004104574 A | 4/2004 |
| JP | 4115784 B2 | 7/2008 |
| WO | 2014194841 A1 | 12/2014 |

OTHER PUBLICATIONS

"HARQ related issues for Licensed-assisted access using LTE", 3GPP TSG RAN WG1 Ad-hoc Meeting Paris, FranceXP050951397 R1-151023 3rd Generation Partnership Project, Valbonne France (Mar. 24-26, 2015).

* cited by examiner

METHOD AND DEVICE FOR DATA RETRANSMISSION

CROSS-REFERENCE TO RELATED APPLICATIONS

This application is a National Stage Application of International Application No. PCT/CN2015/076174, filed on Apr. 9, 2015, which is hereby incorporated by reference in its entirety.

TECHNICAL FIELD

The present invention relates to the communications field, and in particular, to a data retransmission method, a device, and a system.

BACKGROUND

In a wireless communications network, each device needs to transmit information by using a frequency resource. The frequency resource is also referred to as a spectrum. The spectrum may be categorized into a licensed spectrum and an unlicensed spectrum. The licensed spectrum is a frequency resource exclusive to some operators, and the unlicensed spectrum is a common frequency resource in the wireless communications network. A carrier on the licensed spectrum is referred to as a licensed carrier, and a carrier on the unlicensed spectrum is referred to as an unlicensed carrier. With development of communications technologies, an amount of information transmitted in the wireless communications network is increasingly growing. Preempting the unlicensed spectrum to transmit information may improve a data throughput in the wireless communications network, so as to better meet a user requirement.

In the prior art, to improve radio channel transmission reliability, as a main data retransmission means, hybrid automatic repeat request (HARQ) is widely applied. For example, after a first device sends data to a second device, the second device feeds back an acknowledgement/negative acknowledgement (ACK/NACK) message to the first device. The first device determines, according to information fed back by the second device, whether to transmit the data to the second device again. When required, the data is sent again. This process of data transmission is an HARQ process.

For example, in an licensed-assisted access using Long Term Evolution (LAA-LTE) system, when transmitting data by using the unlicensed carrier, a sending device cannot keep occupying a channel. After occupying the unlicensed carrier for a specific time, the sending device needs to preempt the channel again, and this causes interruption in HARQ retransmission. Therefore, a receive end can receive the data again only after the sending device preempts the channel again. How to achieve HARQ retransmission on an unlicensed carrier becomes an urgent problem to be resolved.

SUMMARY

Embodiments of the present invention provide a data retransmission method, a device, and a system, so as to resolve a prior-art problem that when a device transmits data by using an unlicensed carrier, the data cannot be retransmitted because a channel needs to be preempted again.

To achieve the foregoing objective, the following technical solutions are used in the embodiments of the present invention:

According to a first aspect, an embodiment of the present invention provides a data retransmission method, including:

transmitting, by a first device, data to a second device by using a first carrier, where the first carrier is an unlicensed carrier;

obtaining, by the first device, status information of the first carrier, where the status information is used to determine whether the first carrier is available; and when the first carrier is unavailable, retransmitting, by the first device, the data to the second device by using a second carrier, where the first carrier and the second carrier are different carriers.

With reference to the first aspect, in a first possible implementation of the first aspect, the method further includes:

sending, by the first device, control signaling to the second device, where the control signaling is used to indicate the data.

With reference to the first possible implementation of the first aspect, in a second possible implementation of the first aspect, the sending, by the first device, control signaling to the second device includes:

sending, by the first device, the control signaling to the second device by using the second carrier.

With reference to the first possible implementation of the first aspect, in a third possible implementation of the first aspect, the control signaling includes a carrier indicator field CIF, where the carrier indicator field CIF is used to indicate the data.

With reference to any one of the first aspect, or the first to the third possible implementations of the first aspect, in a fourth possible implementation of the first aspect, the obtaining, by the first device, status information of the first carrier includes:

obtaining, by the first device, the status information of the first carrier actively or by using the second device or by using a third-party device or by using preconfigured information.

With reference to any one of the first aspect, or the first to the third possible implementations of the first aspect, in a fifth possible implementation of the first aspect, the method further includes:

sending, by the first device, the status information of the first carrier to the second device.

With reference to the fifth possible implementation of the first aspect, in a sixth possible implementation of the first aspect, the sending, by the first device, the status information of the first carrier to the second device includes:

sending, by the first device, the status information of the first carrier to the second device by using the first carrier or the second carrier.

With reference to any one of the first aspect, or the first to the sixth possible implementations of the first aspect, in a seventh possible implementation of the first aspect, the second carrier is a licensed carrier or an unlicensed carrier.

According to a second aspect, an embodiment of the present invention provides a data retransmission method, including:

receiving, by a second device, data that is transmitted by a first device by using a first carrier, where the first carrier is an unlicensed carrier;

obtaining, by the second device, status information of the first carrier, where the status information is used to determine whether the first carrier is available; and when the first carrier is unavailable, receiving, by the second device by using a second carrier, the data retransmitted by the first device, where the first carrier and the second carrier are different carriers.

With reference to the second aspect, in a first possible implementation of the second aspect, the method further includes:

receiving, by the second device, control signaling sent by the first device, where the control signaling is used to indicate the data.

With reference to the first possible implementation of the second aspect, in a second possible implementation of the second aspect, the receiving, by the second device, control signaling sent by the first device includes:

receiving, by the second device by using the second carrier, the control signaling sent by the first device.

With reference to the first possible implementation of the second aspect, in a third possible implementation of the second aspect, the control signaling includes a carrier indicator field CIF, where the carrier indicator field CIF is used to indicate the data.

With reference to any one of the second aspect, or the first to the third possible implementations of the second aspect, in a fourth possible implementation of the second aspect, the obtaining, by the second device, status information of the first carrier includes:

obtaining, by the second device, the status information of the first carrier actively or by using the first device or by using a third-party device or by using preconfigured information.

With reference to the fourth possible implementation of the second aspect, in a fifth possible implementation of the second aspect, the obtaining, by the second device, status information of the first carrier by using the first device includes:

receiving, by the second device, the status information the first carrier that is sent by the first device.

With reference to the fifth possible implementation of the second aspect, in a sixth possible implementation of the second aspect, the receiving, by the second device, the status information the first carrier that is sent by the first device includes:

receiving, by the second device by using the first carrier or the second carrier, the status information the first carrier that is sent by the first device.

With reference to any one of the second aspect, or the first to the sixth possible implementations of the second aspect, in a seventh possible implementation of the second aspect, the second carrier is a licensed carrier or an unlicensed carrier.

According to a third aspect, an embodiment of the present invention provides a first device, including:

a sending unit, configured to transmit data to a second device by using a first carrier, where the first carrier is an unlicensed carrier;

an obtaining unit, configured to obtain status information of the first carrier, where the status information is used to determine whether the first carrier is available; and a retransmission unit, configured to: when the first carrier is unavailable, retransmit the data to the second device by using a second carrier, where the first carrier and the second carrier are different carriers.

With reference to the third aspect, in a first possible implementation of the third aspect, the sending unit is further configured to send control signaling to the second device, where the control signaling is used to indicate the data.

With reference to the first possible implementation of the third aspect, in a second possible implementation of the third aspect, the sending unit is further configured to send the control signaling to the second device by using the second carrier.

With reference to the first possible implementation of the third aspect, in a third possible implementation of the third aspect, the control signaling includes a carrier indicator field CIF, where the carrier indicator field CIF is used to indicate the data.

With reference to any one of the third aspect, or the first to the third possible implementations of the third aspect, in a fourth possible implementation of the third aspect, the obtaining unit is further configured to obtain the status information of the first carrier actively or by using the second device or by using a third-party device or by using preconfigured information.

With reference to any one of the third aspect, or the first to the third possible implementations of the third aspect, in a fifth possible implementation of the third aspect, the sending unit is further configured to send the status information of the first carrier to the second device.

With reference to the fifth possible implementation of the third aspect, in a sixth possible implementation of the third aspect, the sending unit is further configured to send the status information of the first carrier to the second device by using the first carrier or the second carrier.

According to a fourth aspect, an embodiment of the present invention provides a second device, including:

a first receiving unit, configured to receive data that is transmitted by a first device by using a first carrier, where the first carrier is an unlicensed carrier;

an obtaining unit, configured to obtain status information of the first carrier, where the status information is used to determine whether the first carrier is available; and a second receiving unit, configured to: when the first carrier is unavailable, receive, by using a second carrier, the data retransmitted by the first device, where the first carrier and the second carrier are different carriers.

With reference to the fourth aspect, in a first possible implementation of the fourth aspect, the device further includes:

a third receiving unit, configured to receive control signaling sent by the first device, where the control signaling is used to indicate the data.

With reference to the first possible implementation of the fourth aspect, in a second possible implementation of the fourth aspect, the third receiving unit is further configured to receive, by using the second carrier, the control signaling sent by the first device.

With reference to the first possible implementation of the fourth aspect, in a third possible implementation of the fourth aspect, the control signaling includes a carrier indicator field CIF, where the carrier indicator field CIF is used to indicate the data.

With reference to any one of the fourth aspect, or the first to the third possible implementations of the fourth aspect, in a fourth possible implementation of the fourth aspect, the obtaining unit is further configured to obtain the status information of the first carrier actively or by using the first device or by using a third-party device or by using preconfigured information.

With reference to the fourth possible implementation of the fourth aspect, in a fifth possible implementation of the fourth aspect, the obtaining unit is further configured to receive the status information the first carrier that is sent by the first device.

With reference to the fifth possible implementation of the fourth aspect, in a sixth possible implementation of the fourth aspect, the obtaining unit is further configured to receive, by using the first carrier or the second carrier, the status information the first carrier that is sent by the first device.

According to a fifth aspect, an embodiment of the present invention provides a first device, including a processor, a memory, a bus, and a transmitter, where the processor, the memory, and the transmitter are connected to and communicate with each other by using the bus, where the transmitter is configured to transmit data to a second device by using a first carrier, where the first carrier is an unlicensed carrier;

the processor is configured to obtain status information of the first carrier, where the status information is used to determine whether the first carrier is available; and the transmitter is further configured to: when the first carrier is unavailable, retransmit the data to the second device by using a second carrier, where the first carrier and the second carrier are different carriers.

With reference to the fifth aspect, in a first possible implementation of the fifth aspect, the transmitter is further configured to send control signaling to the second device, where the control signaling is used to indicate the data.

With reference to the first possible implementation of the fifth aspect, in a second possible implementation of the fifth aspect, the transmitter is further configured to send the control signaling to the second device by using the second carrier.

With reference to the first possible implementation of the fifth aspect, in a third possible implementation of the fifth aspect, the control signaling includes a carrier indicator field CIF, where the carrier indicator field CIF is used to indicate the data.

With reference to any one of the fifth aspect, or the first to the third possible implementations of the fifth aspect, in a fourth possible implementation of the fifth aspect, the processor is further configured to obtain the status information of the first carrier actively or by using the second device or by using a third-party device or by using preconfigured information.

With reference to any one of the fifth aspect, or the first to the third possible implementations of the fifth aspect, in a fifth possible implementation of the fifth aspect, the transmitter is further configured to send the status information of the first carrier to the second device.

With reference to the fifth possible implementation of the fifth aspect, in a sixth possible implementation of the fifth aspect, the transmitter is further configured to send the status information of the first carrier to the second device by using the first carrier or the second carrier.

According to a sixth aspect, an embodiment of the present invention provides a second device, including a processor, a memory, a bus, and a receiver, where the processor, the memory, and the receiver are connected to and communicate with each other by using the bus, where the receiver is configured to receive data that is transmitted by a first device by using a first carrier, where the first carrier is an unlicensed carrier;

the processor is configured to obtain status information of the first carrier, where the status information is used to determine whether the first carrier is available; and the receiver is further configured to: when the first carrier is unavailable, receive, by using a second carrier, the data retransmitted by the first device, where the first carrier and the second carrier are different carriers.

With reference to the sixth aspect, in a first possible implementation of the sixth aspect, the receiver is further configured to receive control signaling sent by the first device, where the control signaling is used to indicate the data.

With reference to the first possible implementation of the sixth aspect, in a second possible implementation of the sixth aspect, the receiver is further configured to receive, by using the second carrier, the control signaling sent by the first device.

With reference to the first possible implementation of the sixth aspect, in a third possible implementation of the sixth aspect, the control signaling includes a carrier indicator field CIF, where the carrier indicator field CIF is used to indicate the data.

With reference to any one of the sixth aspect, or the first to the third possible implementations of the sixth aspect, in a fourth possible implementation of the sixth aspect, the processor is further configured to obtain the status information of the first carrier actively or by using the first device or by using a third-party device or by using preconfigured information.

With reference to the fourth possible implementation of the sixth aspect, in a fifth possible implementation of the sixth aspect, the processor is further configured to receive the status information the first carrier that is sent by the first device.

With reference to the fifth possible implementation of the fourth aspect, in a sixth possible implementation of the fourth aspect, the processor is further configured to receive, by using the first carrier or the second carrier, the status information the first carrier that is sent by the first device.

According to a seventh aspect, an embodiment of the present invention provides a wireless communications system, including a first device and a second device, where the first device is the first device according to any one of the third aspect or the possible implementations of the third aspect, and the second device is the second device according to any one of the fourth aspect or the possible implementations of the fourth aspect; or the first device is the first device according to any one of the fifth aspect or the possible implementations of the fifth aspect, and the second device is the second device according to any one of the sixth aspect or the possible implementations of the sixth aspect.

In the data retransmission method, the device, and the system provided in the embodiments of the present invention, a first device transmits data to a second device by using a first carrier, where the first carrier is an unlicensed carrier. The first device obtains status information of the first carrier, where the status information is used to determine whether the first carrier is available. When the first carrier is unavailable, the first device retransmits the data to the second device by using a second carrier, where the first carrier and the second carrier are different carriers. This resolves a prior-art problem that when a device transmits data by using an unlicensed carrier, the data cannot be retransmitted because a channel needs to be preempted again.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person skilled in the art may still derive other drawings from these accompanying drawings without creative efforts.

DESCRIPTION OF EMBODIMENTS

Figure 1:
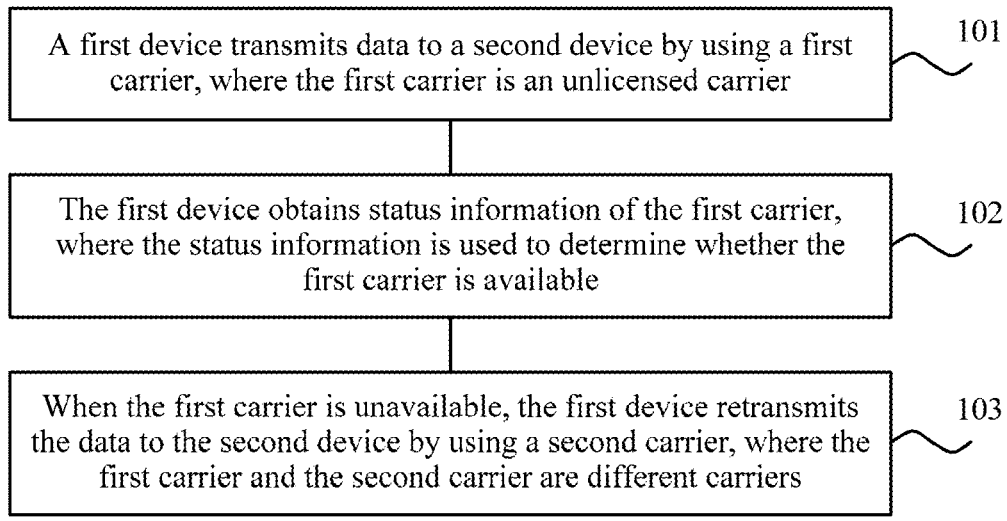
FIG. 1 is a schematic flowchart of a data retransmission method according to an embodiment of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

It should be understood that, the technical solutions of the embodiments of the present invention may be applied to various communications systems, such as a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, Universal Mobile Telecommunications System (UMTS), and a Worldwide Interoperability for Microwave Access (Wi-MAX) communications system.

It should be understood that in the embodiments of the present invention, a first device or a second device includes, but is not limited to, user equipment (UE), a mobile station (MS), a mobile terminal, a mobile telephone, a handset, a portable device (portable equipment), and the like. The user equipment may communicate with one or more core networks by using a radio access network (RAN). For example, the user equipment may be a mobile telephone (or referred to as a "cellular" phone), or a computer having a wireless communication function, or the like; or the user equipment may be a portable, pocket-sized, handheld, computer built-in, or in-vehicle mobile apparatus.

In the embodiments of the present invention, the first device or the second device may be a base station (Base Transceiver Station, BTS) in GSM or CDMA, or may be a base station (NodeB) in WCDMA, or may be an evolved NodeB (eNB or e-NodeB) in LTE, and this is not limited in the embodiments of the present invention.

In the specification, claims, and accompanying drawings of the present invention, the terms "first", "second", "third", "fourth", and the like (if existent) are intended to distinguish between similar objects but do not necessarily indicate a specific order or sequence. It should be understood that the data termed in such a way is interchangeable in proper circumstances so that the embodiments of the present invention described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

It should be understood that a data transmission method provided in the embodiments of the present invention can be applied to a wireless communications system. In the embodiments of the present invention, an LTE/LTE-A wireless communications system is used as an example to describe the method, and this does not constitute a limitation on the present invention.

In the embodiments of the present invention, when the first device is a base station (BTS, Base Transceiver Station) in a Global System for Mobile Communications (GSM) system and a Code Division Multiple Access (CDMA) system or a base station in a Wideband Code Division Multiple Access (WCDMA) system or a base station in an LAA-LTE system, the second device may be user equipment (UE), which includes, but is not limited to, a mobile station (MS), a mobile terminal, a mobile telephone, a handset, a portable device (portable equipment), and the like. The first device may communicate with one or more core networks by using a radio access network (RAN). For example, the second device may be a mobile telephone (or referred to as a "cellular" phone), a computer having a wireless communications function, or the like; or the second device may be a portable, pocket-sized, handheld, computer built-in, or in-vehicle mobile device. When the first device is user equipment, the second device may be a base station. When the first device is user equipment, the second device may also be user equipment. The second device may be a receiving device for receiving data sent by the first device.

An embodiment of the present invention provides a data retransmission method. Preferably, the method is applied to an Licensed Assisted Access Using Long Term Evolution, (LAA-LTE) system or an Long Term Evolution (LTE) system. Referring to FIG. 1, the method includes the following steps:

101. A first device transmits data to a second device by using a first carrier.

The first carrier is an unlicensed carrier.

102. The first device obtains status information of the first carrier, where the status information is used to determine whether the first carrier is available.

The status information of the first carrier includes two states: available and unavailable. If an LAA-LTE device occupies an unlicensed carrier to send data, it indicates that a state of the device on the unlicensed carrier is available, and the state is marked as on. If an LAA-LTE device does not occupy an unlicensed carrier to send data, it indicates that a state of the device on the unlicensed carrier is unavailable, and the state is marked as off.

103. When the first carrier is unavailable, the first device retransmits the data to the second device by using a second carrier, where the first carrier and the second carrier are different carriers.

Specifically, the first device cannot keep occupying the unlicensed carrier. Therefore, after occupying the unlicensed carrier for a specific time, the first device needs to preempt an unlicensed carrier again. That is, when the first device cannot retransmit the data on the first carrier, the data is retransmitted on the second carrier.

Optionally, the second carrier may be a licensed carrier or an unlicensed carrier.

Optionally, the method further includes:
sending, by the first device, control signaling to the second device, where the control signaling is used to indicate the data.

Optionally, the sending, by the first device, control signaling to the second device includes:
sending, by the first device, the control signaling to the second device by using the second carrier.

Optionally, the control signaling includes a carrier indicator field (CIF). The carrier indicator field CIF is used to indicate the data.

The CIF is used to indicate a number of the first carrier on which the data is transmitted, that is, to indicate a carrier from which the data comes.

In the prior art, the CIF is used to indicate cross-carrier scheduling. For example, a number of the licensed carrier is 1, and a number of the unlicensed carrier is 2. If an indication CIF=2 appears on the licensed carrier, it indicates that data on the unlicensed carrier whose number is 2 is scheduled on the licensed carrier by means of cross-carrier. After receiving this piece of information DCI, a receive end needs to receive the data at a corresponding location on the unlicensed carrier.

In this embodiment of the present invention, if a receiving device clearly knows that the unlicensed carrier whose number is 2 is in an off state, that is, a corresponding sending device does not occupy the unlicensed carrier whose number is 2 to send the data, the receiving device receives the downlink control information (DCI) CIF=2 on the licensed carrier, indicating that an HARQ retransmission packet on the unlicensed carrier whose number is 2 is transmitted on the licensed carrier by means of cross-carrier. After receiving this piece of information DCI, the receive end needs to continue to receive, at a corresponding location on the licensed carrier, HARQ retransmission data on the unlicensed carrier whose number is 2. Certainly, in this case, new data indicator (NDI) information in the DCI may be used to indicate that the data is an HARQ retransmission packet.

In this case, it may be understood that, when self-carrier data or self-carrier HARQ retransmission data is transmitted on the second carrier, a CIF field may or may not be omitted from corresponding DCI used to indicate the data, and in this case, a value of a CIF is a carrier number of the second carrier.

An advantage of not omitting the CIF field is that when receiving cross-carrier transmission HARQ data of the first carrier transmitted on the second carrier and the self-carrier data or the self-carrier HARQ retransmission data transmitted on the second carrier, the receiving device may demodulate and decode the DCI according to a same DCI length, so that understanding of the DCI length is not confused, a behavior of the receiving device is relatively simple, and blind detection does not need to be performed on the DCI length.

In the prior art, when the first carrier is in an on state, an HARQ retransmission packet is transmitted on the first carrier, and the receiving device receives the self-carrier HARQ retransmission packet on the first carrier. In this case, cross-carrier transmission does not exist on the second carrier. When self-carrier data or self-carrier HARQ retransmission data is transmitted on the first carrier or the second carrier, a CIF field may be omitted from a corresponding DCI used to indicate the data.

In this embodiment of the present invention, a scenario in which the HARQ retransmission packet is transmitted by means of cross-carrier exists, and the CIF field is used. The CIF field in DCI signaling is used to indicate the data.

Optionally, the obtaining, by the first device, status information of the first carrier includes:
obtaining, by the first device, the status information of the first carrier actively or by using the second device or by using a third-party device or by using preconfigured information.

Optionally, the method further includes:
sending, by the first device, the status information of the first carrier to the second device.

Optionally, the sending, by the first device, the status information of the first carrier to the second device includes:
sending, by the first device, the status information of the first carrier to the second device by using the first carrier or the second carrier.

Specifically, the first device may notify all receive ends by transmitting corresponding information by using a licensed carrier, such as physical broadcast channel (PBCH), or may notify, by using physical downlink control channel (PDCCH) or physical uplink control channel (PUCCH) or radio resource control (RRC) signaling on a licensed carrier corresponding to a time when an on-off status of the first device on the first carrier changes, receive ends that the on-off status of the first carrier changes.

The on-off status of the first device on the first carrier may further be notified to all the receive ends by transmitting corresponding information by using the first carrier. Specifically, the receive ends may be notified, by using PDCCH or PUCCH or RRC signaling on the first carrier corresponding to a time when the on-off status on the first carrier changes, that the on-off status of the first carrier changes.

In the data retransmission method provided in this embodiment of the present invention, a first device transmits data to a second device by using a first carrier, where the first carrier is an unlicensed carrier. The first device obtains status information of the first carrier, where the status information is used to determine whether the first carrier is available. When the first carrier is unavailable, the first device retransmits the data to the second device by using a second carrier, where the first carrier and the second carrier are different carriers. This resolves a prior-art problem that when a device transmits data by using an unlicensed carrier, the data cannot be retransmitted because a channel needs to be preempted again.

Figure 2:
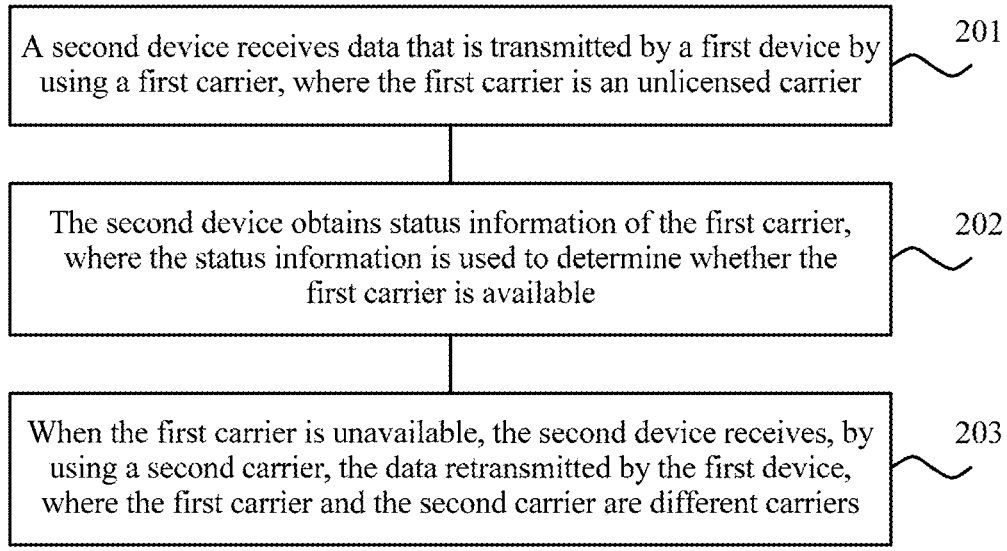
FIG. 2 is a schematic flowchart of a data retransmission method according to another embodiment of the present invention.

Another embodiment of the present invention provides a data retransmission method, which is corresponding to a receive side of the data retransmission method described in the embodiment shown in FIG. 1. Preferably, the method is applied to an LAA-LTE system or an LTE system. Referring to FIG. 2, the method includes the following steps:

201. A second device receives data that is transmitted by a first device by using a first carrier.

The first carrier is an unlicensed carrier.

202. The second device obtains status information of the first carrier, where the status information is used to determine whether the first carrier is available.

The status information of the first carrier includes two states: available and unavailable. If an LAA-LTE device occupies an unlicensed carrier to send data, it indicates that a state of the device on the unlicensed carrier is available, and the state is marked as on. If an LAA-LTE device does not occupy an unlicensed carrier to send data, it indicates that a state of the device on the unlicensed carrier is unavailable, and the state is marked as off.

203. When the first carrier is unavailable, the second device receives, by using a second carrier, the data retransmitted by the second device, where the first carrier and the second carrier are different carriers.

Specifically, the first device cannot keep occupying the unlicensed carrier. Therefore, after occupying the unlicensed carrier for a specific time, the first device needs to preempt an unlicensed carrier again. That is, when the first device cannot retransmit the data on the first carrier, the data is retransmitted on the second carrier.

Optionally, the second carrier may be a licensed carrier or an unlicensed carrier.

Optionally, the method further includes:

receiving, by the second device, control signaling sent by the first device, where the control signaling is used to indicate the data.

Optionally, the receiving, by the second device, control signaling sent by the first device includes:

receiving, by the second device by using the second carrier, the control signaling sent by the first device.

Optionally, the control signaling includes a carrier indicator field (CIF). The carrier indicator field CIF is used to indicate the data.

The CIF is used to indicate a number of the first carrier on which the data is transmitted, that is, to indicate a carrier from which the data comes.

In the prior art, the CIF is used to indicate cross-carrier scheduling. For example, a number of the licensed carrier is 1, and a number of the unlicensed carrier is 2. If an indication CIF=2 appears on the licensed carrier, it indicates that data on the unlicensed carrier whose number is 2 is scheduled on the licensed carrier by means of cross-carrier. After receiving this piece of information DCI, a receive end needs to receive the data at a corresponding location on the unlicensed carrier.

In this embodiment of the present invention, if a receiving device clearly knows that the unlicensed carrier whose number is 2 is in an off state, that is, a corresponding sending device does not occupy the unlicensed carrier whose number is 2 to send the data, the receiving device receives the downlink control information (DCI) CIF=2 on the licensed carrier, indicating that an HARQ retransmission packet on the unlicensed carrier whose number is 2 is transmitted on the licensed carrier by means of cross-carrier. After receiving this piece of information DCI, the receive end needs to continue to receive, at a corresponding location on the licensed carrier, HARQ retransmission data on the unlicensed carrier whose number is 2. Certainly, in this case, NDI (New Data Indicator, new data indicator) information in the DCI may be used to indicate that the data is an HARQ retransmission packet.

In this case, it may be understood that, when self-carrier data or self-carrier HARQ retransmission data is transmitted on the second carrier, a CIF field may or may not be omitted from corresponding DCI used to indicate the data, and in this case, a value of a CIF is a carrier number of the second carrier.

An advantage of not omitting the CIF field is that when receiving cross-carrier transmission HARQ data of the first carrier transmitted on the second carrier and the self-carrier data or the self-carrier HARQ retransmission data transmitted on the second carrier, the receiving device may demodulate and decode the DCI according to a same DCI length, so that understanding of the DCI length is not confused, a behavior of the receiving device is relatively simple, and blind detection does not need to be performed on the DCI length.

In the prior art, when the first carrier is in an on state, an HARQ retransmission packet is transmitted on the first carrier, and the receiving device receives the self-carrier HARQ retransmission packet on the first carrier. In this case, cross-carrier transmission does not exist on the second carrier. When self-carrier data or self-carrier HARQ retransmission data is transmitted on the first carrier or the second carrier, a CIF field may be omitted from a corresponding DCI used to indicate the data.

In this embodiment of the present invention, a scenario in which the HARQ retransmission packet is transmitted by means of cross-carrier exists, and the CIF field is used. The CIF field in DCI signaling is used to indicate the data.

Optionally, that the second device obtains status information of the first carrier includes:

obtaining, by the second device, the status information of the first carrier actively or by using the first device or by using a third-party device or by using preconfigured information.

Optionally, the obtaining, by the second device, status information of the first carrier by using the first device includes:

receiving, by the second device, the status information the first carrier that is sent by the first device.

Optionally, the receiving, by the second device, the status information the first carrier that is sent by the first device includes:

receiving, by the second device by using the first carrier or the second carrier, the status information the first carrier that is sent by the first device.

Specifically, the first device may notify all receive ends by transmitting corresponding information by using a licensed carrier, such as physical broadcast channel (PBCH), or may notify, by using physical downlink control channel (PDCCH) or physical uplink control channel (PUCCH) or radio resource control (RRC) signaling on a licensed carrier corresponding to a time when an on-off status of the first device on the first carrier changes, receive ends that the on-off status of the first carrier changes.

The on-off status of the first device on the first carrier may further be notified to all the receive ends by transmitting corresponding information by using the first carrier. Specifically, the receive ends may be notified, by using PDCCH or PUCCH or RRC signaling on the first carrier corresponding to a time when the on-off status on the first carrier changes, that the on-off status of the first carrier changes.

In the data retransmission method provided in this embodiment of the present invention, a second device receives data that is transmitted by a first device by using a first carrier, where the first carrier is an unlicensed carrier. The second device obtains status information of the first carrier, where the status information is used to determine whether the first carrier is available. When the first carrier is unavailable, the second device receives, by using a second carrier, the data retransmitted by the first device, where the first carrier and the second carrier are different carriers. This resolves a prior-art problem that when a device transmits data by using an unlicensed carrier, the data cannot be retransmitted because a channel needs to be preempted again.

Figure 3:
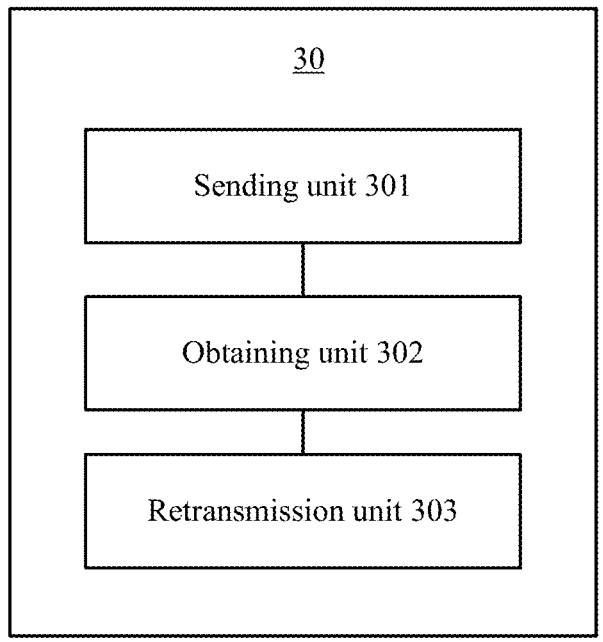
FIG. 3 is a schematic structural diagram of a first device according to an embodiment of the present invention.

Based on the foregoing embodiment corresponding to FIG. 1, an embodiment of the present invention provides a first device, configured to execute the data retransmission method described in the foregoing embodiment corresponding to FIG. 1. Preferably, the first device is applied to an LAA-LTE system or an LTE system. Optionally, the first device may be a base station or user equipment. Referring to FIG. 3, the first device 30 includes a sending unit 301, an obtaining unit 302, and a retransmission unit 303.

The sending unit 301 is configured to transmit data to a second device by using a first carrier.

The first carrier is an unlicensed carrier.

The obtaining unit 302 is configured to obtain status information of the first carrier, where the status information is used to determine whether the first carrier is available.

The status information of the first carrier includes two states: available and unavailable. If an LAA-LTE device occupies an unlicensed carrier to send data, it indicates that a state of the device on the unlicensed carrier is available, and the state is marked as on. If an LAA-LTE device does not occupy an unlicensed carrier to send data, it indicates that a state of the device on the unlicensed carrier is unavailable, and the state is marked as off.

The retransmission unit 303 is configured to: when the first carrier is unavailable, retransmit the data to the second device by using a second carrier, where the first carrier and the second carrier are different carriers.

Specifically, the first device cannot keep occupying the unlicensed carrier. Therefore, after occupying the unlicensed carrier for a specific time, the first device needs to preempt an unlicensed carrier again. That is, when the first device cannot retransmit the data on the first carrier, the data is retransmitted on the second carrier.

Optionally, the second carrier may be a licensed carrier or an unlicensed carrier.

Optionally, the sending unit 301 is further configured to send control signaling to the second device, where the control signaling is used to indicate the data.

Optionally, the sending unit 301 is further configured to send the control signaling to the second device by using the second carrier.

Optionally, the control signaling includes a carrier indicator field (CIF). The carrier indicator field CIF is used to indicate the data.

The CIF is used to indicate a number of the first carrier on which the data is transmitted, that is, to indicate a carrier from which the data comes.

In the prior art, the CIF is used to indicate cross-carrier scheduling. For example, a number of the licensed carrier is 1, and a number of the unlicensed carrier is 2. If an indication CIF=2 appears on the licensed carrier, it indicates that data on the unlicensed carrier whose number is 2 is scheduled on the licensed carrier by means of cross-carrier. After receiving this piece of information DCI, a receive end needs to receive the data at a corresponding location on the unlicensed carrier.

In this embodiment of the present invention, if a receiving device clearly knows that the unlicensed carrier whose number is 2 is in an off state, that is, a corresponding sending device does not occupy the unlicensed carrier whose number is 2 to send the data, the receiving device receives the downlink control information (DCI) CIF=2 on the licensed carrier, indicating that an HARQ retransmission packet on the unlicensed carrier whose number is 2 is transmitted on the licensed carrier by means of cross-carrier. After receiving this piece of information DCI, the receive end needs to continue to receive, at a corresponding location on the licensed carrier, HARQ retransmission data on the unlicensed carrier whose number is 2. Certainly, in this case, NDI (New Data Indicator, new data indicator) information in the DCI may be used to indicate that the data is an HARQ retransmission packet.

In this case, it may be understood that, when self-carrier data or self-carrier HARQ retransmission data is transmitted on the second carrier, a CIF field may or may not be omitted from corresponding DCI used to indicate the data, and in this case, a value of a CIF is a carrier number of the second carrier.

An advantage of not omitting the CIF field is that when receiving cross-carrier transmission HARQ data of the first carrier transmitted on the second carrier and the self-carrier data or the self-carrier HARQ retransmission data transmitted on the second carrier, the receiving device may demodulate and decode the DCI according to a same DCI length, so that understanding of the DCI length is not confused, a behavior of the receiving device is relatively simple, and blind detection does not need to be performed on the DCI length.

In the prior art, when the first carrier is in an on state, an HARQ retransmission packet is transmitted on the first carrier, and the receiving device receives the self-carrier HARQ retransmission packet on the first carrier. In this case, cross-carrier transmission does not exist on the second carrier. When self-carrier data or self-carrier HARQ retransmission data is transmitted on the first carrier or the second carrier, a CIF field may be omitted from a corresponding DCI used to indicate the data.

In this embodiment of the present invention, a scenario in which the HARQ retransmission packet is transmitted by means of cross-carrier exists, and the CIF field is used. The CIF field in DCI signaling is used to indicate the data.

Optionally, the obtaining unit 302 is further configured to obtain the status information of the first carrier actively or by using the second device or by using a third-party device or by using preconfigured information.

Optionally, the sending unit 301 is further configured to send the status information of the first carrier to the second device.

Optionally, the sending unit 301 is further configured to send the status information of the first carrier to the second device by using the first carrier or the second carrier.

Specifically, the sending unit 301 may notify all receive ends by transmitting corresponding information by using a licensed carrier, such as physical broadcast channel (PBCH), or may notify, by using physical downlink control channel (PDCCH) or physical uplink control channel (PUCCH) or radio resource control (RRC) signaling on a licensed carrier corresponding to a time when an on-off status of the first device on the first carrier changes, receive ends that the on-off status of the first carrier changes.

The on-off status of the first device on the first carrier may further be notified to all the receive ends by transmitting corresponding information by using the first carrier. Specifically, the receive ends may be notified, by using PDCCH or PUCCH or RRC signaling on the first carrier corresponding to a time when the on-off status on the first carrier changes, that the on-off status of the first carrier changes.

The first device provided in this embodiment of the present invention transmits data to a second device by using a first carrier, where the first carrier is an unlicensed carrier; obtains status information of the first carrier, where the status information is used to determine whether the first carrier is available; and when the first carrier is unavailable, retransmits the data to the second device by using a second carrier, where the first carrier and the second carrier are different carriers. This resolves a prior-art problem that when a device transmits data by using an unlicensed carrier, the data cannot be retransmitted because a channel needs to be preempted again.

Figure 4:
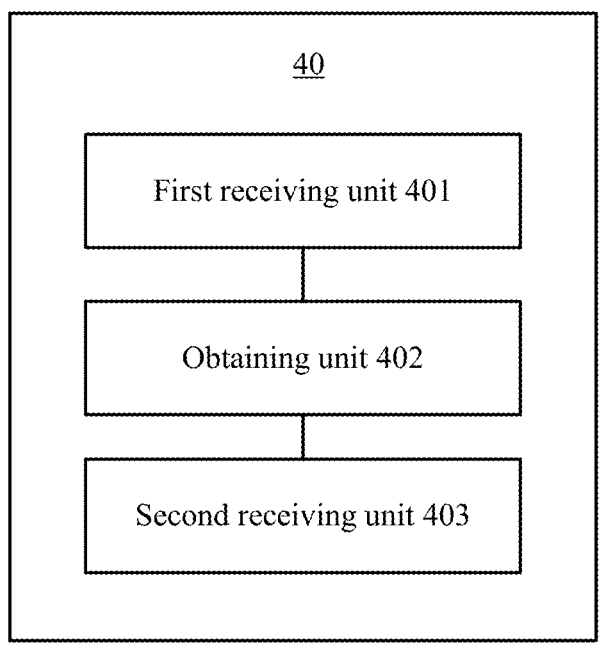
FIG. 4 is a schematic structural diagram of a second device according to an embodiment of the present invention.

Based on the foregoing embodiment corresponding to FIG. 2, an embodiment of the present invention provides a second device, configured to execute the data retransmission method described in the foregoing embodiment corresponding to FIG. 2. Preferably, the second device is applied to an LAA-LTE system or an LTE system. Optionally, the second device may be a base station or user equipment. Referring to FIG. 4, the second device 40 includes a first receiving unit 401, an obtaining unit 402, and a second receiving unit 403.

The first receiving unit 401 is configured to receive data that is transmitted by a first device by using a first carrier.

The first carrier is an unlicensed carrier.

The obtaining unit 402 is configured to obtain status information of the first carrier, where the status information is used to determine whether the first carrier is available.

The status information of the first carrier includes two states: available and unavailable. If an LAA-LTE device occupies an unlicensed carrier to send data, it indicates that a state of the device on the unlicensed carrier is available, and the state is marked as on. If an LAA-LTE device does not occupy an unlicensed carrier to send data, it indicates that a state of the device on the unlicensed carrier is unavailable, and the state is marked as off.

The second receiving unit 403 is configured to: when the first carrier is unavailable, receive, by using a second carrier, the data retransmitted by the first device, where the first carrier and the second carrier are different carriers.

Specifically, the first device cannot keep occupying the unlicensed carrier. Therefore, after occupying the unlicensed carrier for a specific time, the first device needs to preempt an unlicensed carrier again. That is, when the first device cannot retransmit the data on the first carrier, the data is retransmitted on the second carrier.

Optionally, the second carrier may be a licensed carrier or an unlicensed carrier.

Optionally, the device further includes:

a third receiving unit, configured to receive control signaling sent by the first device, where the control signaling is used to indicate the data.

Optionally, the third receiving unit is further configured to receive, by using the second carrier, the control signaling sent by the first device.

Optionally, the control signaling includes a CIF. The carrier indicator field CIF is used to indicate the data.

The CIF is used to indicate a number of the first carrier on which the data is transmitted, that is, to indicate a carrier from which the data comes.

In the prior art, the CIF is used to indicate cross-carrier scheduling. For example, a number of the licensed carrier is 1, and a number of the unlicensed carrier is 2. If an indication CIF=2 appears on the licensed carrier, it indicates that data on the unlicensed carrier whose number is 2 is scheduled on the licensed carrier by means of cross-carrier.

After receiving this piece of information DCI, a receive end needs to receive the data at a corresponding location on the unlicensed carrier.

In this embodiment of the present invention, if a receiving device clearly knows that the unlicensed carrier whose number is 2 is in an off state, that is, a corresponding sending device does not occupy the unlicensed carrier whose number is 2 to send the data, the receiving device receives the DCI CIF=2 on the licensed carrier, indicating that an HARQ retransmission packet on the unlicensed carrier whose number is 2 is transmitted on the licensed carrier by means of cross-carrier. After receiving this piece of information DCI, the receive end needs to continue to receive, at a corresponding location on the licensed carrier, HARQ retransmission data on the unlicensed carrier whose number is 2. Certainly, in this case, NDI (New Data Indicator, new data indicator) information in the DCI may be used to indicate that the data is an HARQ retransmission packet.

In this case, it may be understood that, when self-carrier data or self-carrier HARQ retransmission data is transmitted on the second carrier, a CIF field may or may not be omitted from corresponding DCI used to indicate the data, and in this case, a value of a CIF is a carrier number of the second carrier.

An advantage of not omitting the CIF field is that when receiving cross-carrier transmission HARQ data of the first carrier transmitted on the second carrier and the self-carrier data or the self-carrier HARQ retransmission data transmitted on the second carrier, the receiving device may demodulate and decode the DCI according to a same DCI length, so that understanding of the DCI length is not confused, a behavior of the receiving device is relatively simple, and blind detection does not need to be performed on the DCI length.

In the prior art, when the first carrier is in an on state, an HARQ retransmission packet is transmitted on the first carrier, and the receiving device receives the self-carrier HARQ retransmission packet on the first carrier. In this case, cross-carrier transmission does not exist on the second carrier. When self-carrier data or self-carrier HARQ retransmission data is transmitted on the first carrier or the second carrier, a CIF field may be omitted from a corresponding DCI used to indicate the data.

In this embodiment of the present invention, a scenario in which the HARQ retransmission packet is transmitted by means of cross-carrier exists, and the CIF field is used. The CIF field in DCI signaling is used to indicate the data.

Optionally, the obtaining unit 402 is further configured to obtain the status information of the first carrier actively or by using the first device or by using a third-party device or by using preconfigured information.

Optionally, the obtaining unit 402 is further configured to receive the status information the first carrier that is sent by the first device.

Optionally, the obtaining unit 402 is further configured to receive, by using the first carrier or the second carrier, the status information the first carrier that is sent by the first device.

Specifically, the first device may notify all receive ends by transmitting corresponding information by using a licensed carrier, such as PBCH, or may notify, by using PDCCH or PUCCH (Physical uplink Control Channel, physical uplink control channel) or RRC signaling on a licensed carrier corresponding to a time when an on-off status of the first device on the first carrier changes, receive ends that the on-off status of the first carrier changes.

The on-off status of the first device on the first carrier may further be notified to all the receive ends by transmitting corresponding information by using the first carrier. Specifically, the receive ends may be notified, by using PDCCH or PUCCH or RRC signaling on the first carrier corresponding to a time when the on-off status on the first carrier changes, that the on-off status of the first carrier changes.

The second device provided in this embodiment of the present invention receives data that is transmitted by a first device by using a first carrier, where the first carrier is an unlicensed carrier; obtains status information of the first carrier, where the status information is used to determine whether the first carrier is available; and when the first carrier is unavailable, receives, by using a second carrier, the data retransmitted by the first device, where the first carrier and the second carrier are different carriers. This resolves a prior-art problem that when a device transmits data by using an unlicensed carrier, the data cannot be retransmitted because a channel needs to be preempted again.

Figure 5:
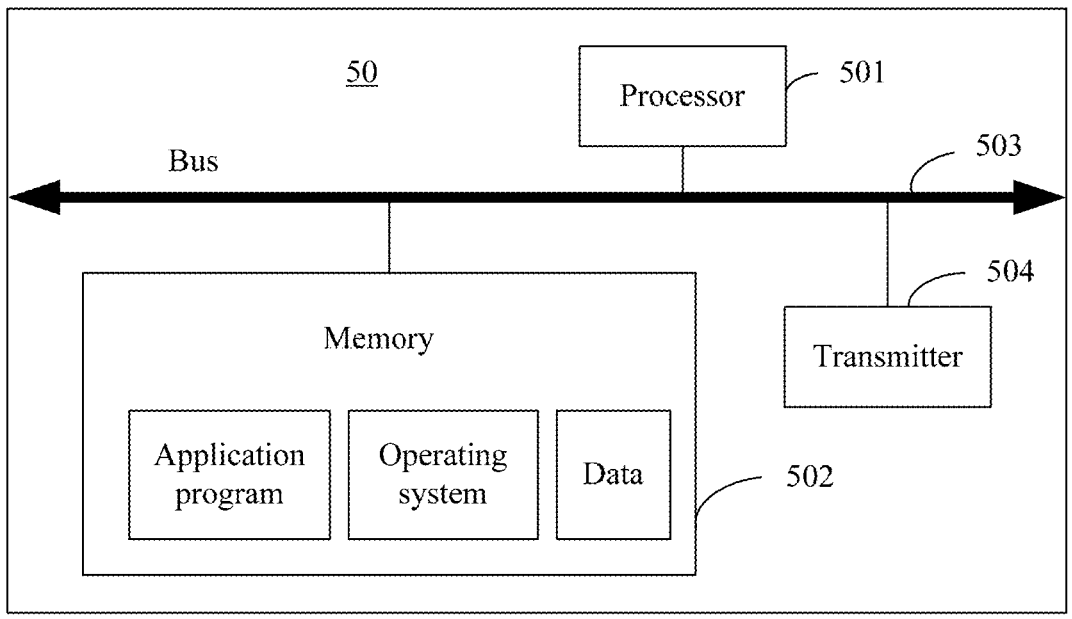
FIG. 5 is a schematic structural diagram of a first device according to another embodiment of the present invention.

Based on the foregoing embodiments corresponding to FIG. 1, another embodiment of the present invention provides a first device, configured to execute the data retransmission method described in the foregoing embodiments corresponding to FIG. 1. Preferably, the first device is applied to an LAA-LTE system or an LTE system. Optionally, the first device may be a base station or user equipment. Referring to FIG. 5, the first device 50 includes at least one processor 501, a memory 502, a bus 503, and a transmitter 504. The at least one processor 501, the memory 502, and the transmitter 504 are connected to and communicate with each other by using the bus 503.

The bus 503 may be an industry standard architecture (ISA) bus, a peripheral component interconnect (PCI) bus, an extended industry standard architecture (EISA) bus, or the like. The bus 503 may be categorized into an address bus, a data bus, a control bus, and the like. For ease of illustration, only one bold line is used in FIG. 5 to represent the bus, which, however, does not mean there is only one bus or only one type of bus.

The memory 502 is configured to store application program code that executes the solutions of the present invention. The application program code that executes the solutions of the present invention is stored in the memory 502, and execution thereof is controlled by the processor 501.

The memory 502 may be a read-only memory ROM or a static storage device of another type that may store static information and instructions, or a random access memory RAM or a dynamic storage device of another type that may store information and instructions; or may be an electrically erasable programmable read-only memory EEPROM, a compact disc read-only memory CD-ROM or other compact disc storage, optical disc storage (including a compact disc, a laser disc, an optical disc, a digital versatile disc, and a Blu-ray disc, and the like), a disk storage medium or another magnetic storage device, or any other medium that can be used to carry or store expected program code in an instruction or data structure form and can be accessed by a computer, which, however, is not limited herein. The memories are connected to the processor by using the bus.

The processor 501 may be a central processing unit 501 (CPU), or an application-specific integrated circuit (ASIC), or one or more integrated circuits configured to implement this embodiment of the present invention.

The processor 501 is configured to invoke the program code in the memory 502. In a possible implementation, when the foregoing application program is executed by the processor 501, the following functions are implemented.

The transmitter 504 is configured to transmit data to a second device by using a first carrier, where the first carrier is an unlicensed carrier.

The processor 501 is configured to obtain status information of the first carrier, where the status information is used to determine whether the first carrier is available.

The transmitter 504 is further configured to: when the first carrier is unavailable, retransmit the data to the second device by using a second carrier, where the first carrier and the second carrier are different carriers.

Optionally, the second carrier may be a licensed carrier or an unlicensed carrier.

Optionally, the transmitter 504 is further configured to send control signaling to the second device, where the control signaling is used to indicate the data.

Optionally, the transmitter 504 is further configured to send the control signaling to the second device by using the second carrier.

Optionally, the control signaling includes a CIF. The carrier indicator field CIF is used to indicate the data.

The CIF is used to indicate a number of the first carrier on which the data is transmitted, that is, to indicate a carrier from which the data comes.

In the prior art, the CIF is used to indicate cross-carrier scheduling. For example, a number of the licensed carrier is 1, and a number of the unlicensed carrier is 2. If an indication CIF=2 appears on the licensed carrier, it indicates that data on the unlicensed carrier whose number is 2 is scheduled on the licensed carrier by means of cross-carrier. After receiving this piece of information DCI, a receive end needs to receive the data at a corresponding location on the unlicensed carrier.

In this embodiment of the present invention, if a receiving device clearly knows that the unlicensed carrier whose number is 2 is in an off state, that is, a corresponding sending device does not occupy the unlicensed carrier whose number is 2 to send the data, the receiving device receives the DCI CIF=2 on the licensed carrier, indicating that an HARQ retransmission packet on the unlicensed carrier whose number is 2 is transmitted on the licensed carrier by means of cross-carrier. After receiving this piece of information DCI, the receive end needs to continue to receive, at a corresponding location on the licensed carrier, HARQ retransmission data on the unlicensed carrier whose number is 2. Certainly, in this case, NDI information in the DCI may be used to indicate that the data is an HARQ retransmission packet.

In this case, it may be understood that, when self-carrier data or self-carrier HARQ retransmission data is transmitted on the second carrier, a CIF field may or may not be omitted from corresponding DCI used to indicate the data, and in this case, a value of a CIF is a carrier number of the second carrier.

An advantage of not omitting the CIF field is that when receiving cross-carrier transmission HARQ data of the first carrier transmitted on the second carrier and the self-carrier data or the self-carrier HARQ retransmission data transmitted on the second carrier, the receiving device may demodulate and decode the DCI according to a same DCI length, so that understanding of the DCI length is not confused, a behavior of the receiving device is relatively simple, and blind detection does not need to be performed on the DCI length.

In the prior art, when the first carrier is in an on state, an HARQ retransmission packet is transmitted on the first carrier, and the receiving device receives the self-carrier HARQ retransmission packet on the first carrier. In this case, cross-carrier transmission does not exist on the second carrier. When self-carrier data or self-carrier HARQ retransmission data is transmitted on the first carrier or the second carrier, a CIF field may be omitted from a corresponding DCI used to indicate the data.

In this embodiment of the present invention, a scenario in which the HARQ retransmission packet is transmitted by means of cross-carrier exists, and the CIF field is used. The CIF field in DCI signaling is used to indicate the data.

Optionally, the processor 501 is further configured to obtain the status information of the first carrier actively or by using the second device or by using a third-party device or by using preconfigured information.

Optionally, the transmitter 504 is further configured to send the status information of the first carrier to the second device.

Optionally, the transmitter 504 is further configured to send the status information of the first carrier to the second device by using the first carrier or the second carrier.

Specifically, the transmitter 504 may notify all receive ends by transmitting corresponding information by using a licensed carrier, such as PBCH, or may notify, by using PDCCH or PUCCH or RRC signaling on a licensed carrier corresponding to a time when an on-off status of the first device on the first carrier changes, receive ends that the on-off status of the first carrier changes.

The on-off status of the first device on the first carrier may further be notified to all the receive ends by transmitting corresponding information by using the first carrier. Specifically, the receive ends may be notified, by using PDCCH or PUCCH or RRC signaling on the first carrier corresponding to a time when the on-off status on the first carrier changes, that the on-off status of the first carrier changes.

The first device provided in this embodiment of the present invention transmits data to a second device by using a first carrier, where the first carrier is an unlicensed carrier; obtains status information of the first carrier, where the status information is used to determine whether the first carrier is available; and when the first carrier is unavailable, retransmits the data to the second device by using a second carrier, where the first carrier and the second carrier are different carriers. This resolves a prior-art problem that when a device transmits data by using an unlicensed carrier, the data cannot be retransmitted because a channel needs to be preempted again.

Figure 6:
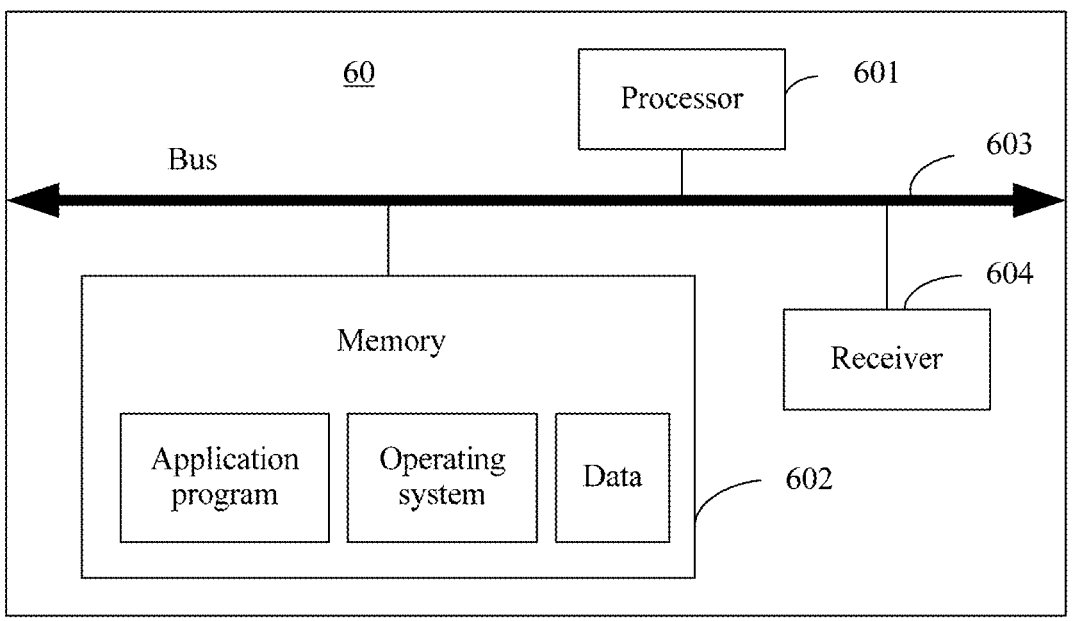
FIG. 6 is a schematic structural diagram of a second device according to another embodiment of the present invention.

Based on the foregoing embodiments corresponding to FIG. 2, another embodiment of the present invention provides a second device, configured to execute the data retransmission method described in the foregoing embodiments corresponding to FIG. 2. Preferably, the second device is applied to an LAA-LTE system or an LTE system. Optionally, the second device may be a base station or user equipment. Referring to FIG. 6, the second device 60 includes at least one processor 601, a memory 602, a bus 603, and a receiver 604. The at least one processor 601, the memory 602, and the receiver 604 are connected to and communicate with each other by using the bus 603.

The bus 603 may be an ISA bus, a PCI bus, an EISA bus, or the like. The bus 603 may be categorized into an address bus, a data bus, a control bus, and the like. For ease of illustration, only one bold line is used in FIG. 6 to represent the bus, which, however, does not mean there is only one bus or only one type of bus.

The memory 602 is configured to store application program code that executes the solutions of the present invention. The application program code that executes the solutions of the present invention is stored in the memory, and execution thereof is controlled by the processor 601.

The memory may be a read-only memory ROM or a static storage device of another type that may store static information and instructions, or a random access memory RAM or a dynamic storage device of another type that may store information and instructions; or may be an electrically erasable programmable read-only memory EEPROM, a compact disc read-only memory CD-ROM or other compact disc storage, optical disc storage (including a compact disc, a laser disc, an optical disc, a digital versatile disc, and a Blu-ray disc, and the like), a disk storage medium or another magnetic storage device, or any other medium that can be used to carry or store expected program code in an instruction or data structure form and can be accessed by a computer, which, however, is not limited herein. The memories are connected to the processor by using the bus.

The processor 601 may be a central processing unit 601, or an application-specific integrated circuit, or one or more integrated circuits configured to implement this embodiment of the present invention.

The processor 601 is configured to invoke the program code in the memory 602. In a possible implementation, when the foregoing application program is executed by the processor 601, the following functions are implemented:

The receiver 604 is configured to receive data that is transmitted by a first device by using a first carrier, where the first carrier is an unlicensed carrier.

The processor 601 is configured to obtain status information of the first carrier, where the status information is used to determine whether the first carrier is available.

The receiver 604 is further configured to: when the first carrier is unavailable, receive, by using a second carrier, the data retransmitted by the first device, where the first carrier and the second carrier are different carriers.

Optionally, the second carrier may be a licensed carrier or an unlicensed carrier.

Optionally, the receiver 604 is further configured to receive control signaling sent by the first device, where the control signaling is used to indicate the data.

Optionally, the receiver 604 is further configured to receive, by using the second carrier, the control signaling sent by the first device.

Optionally, the control signaling includes a CIF. The carrier indicator field CIF is used to indicate the data.

The CIF is used to indicate a number of the first carrier on which the data is transmitted, that is, to indicate a carrier from which the data comes.

In the prior art, the CIF is used to indicate cross-carrier scheduling. For example, a number of the licensed carrier is 1, and a number of the unlicensed carrier is 2. If an indication CIF=2 appears on the licensed carrier, it indicates that data on the unlicensed carrier whose number is 2 is scheduled on the licensed carrier by means of cross-carrier. After receiving this piece of information DCI, a receive end needs to receive the data at a corresponding location on the unlicensed carrier.

In this embodiment of the present invention, if a receiving device clearly knows that the unlicensed carrier whose number is 2 is in an off state, that is, a corresponding sending device does not occupy the unlicensed carrier whose number is 2 to send the data, the receiving device receives the DCI CIF=2 on the licensed carrier, indicating that an HARQ retransmission packet on the unlicensed carrier whose number is 2 is transmitted on the licensed carrier by means of cross-carrier. After receiving this piece of information DCI, the receive end needs to continue to receive, at a corresponding location on the licensed carrier, HARQ retransmission data on the unlicensed carrier whose number is 2. Certainly, in this case, NDI information in the DCI may be used to indicate that the data is an HARQ retransmission packet.

In this case, it may be understood that, when self-carrier data or self-carrier HARQ retransmission data is transmitted on the second carrier, a CIF field may or may not be omitted from corresponding DCI used to indicate the data, and in this case, a value of a CIF is a carrier number of the second carrier.

An advantage of not omitting the CIF field is that when receiving cross-carrier transmission HARQ data of the first carrier transmitted on the second carrier and the self-carrier data or the self-carrier HARQ retransmission data transmitted on the second carrier, the receiving device may demodulate and decode the DCI according to a same DCI length, so that understanding of the DCI length is not confused, a behavior of the receiving device is relatively simple, and blind detection does not need to be performed on the DCI length.

In the prior art, when the first carrier is in an on state, an HARQ retransmission packet is transmitted on the first carrier, and the receiving device receives the self-carrier HARQ retransmission packet on the first carrier. In this case, cross-carrier transmission does not exist on the second carrier. When self-carrier data or self-carrier HARQ retransmission data is transmitted on the first carrier or the second carrier, a CIF field may be omitted from a corresponding DCI used to indicate the data.

In this embodiment of the present invention, a scenario in which the HARQ retransmission packet is transmitted by means of cross-carrier exists, and the CIF field is used. The CIF field in DCI signaling is used to indicate the data.

Optionally, the processor 601 is further configured to obtain the status information of the first carrier actively or by using the first device or by using a third-party device or by using preconfigured information.

Optionally, the processor 601 is further configured to receive the status information the first carrier that is sent by the first device.

Optionally, the processor 601 is further configured to receive, by using the first carrier or the second carrier, the status information the first carrier that is sent by the first device.

Specifically, the first device may notify all receive ends by transmitting corresponding information by using a licensed carrier, such as PBCH, or may notify, by using PDCCH or PUCCH or RRC signaling on a licensed carrier corresponding to a time when an on-off status of the first device on the first carrier changes, receive ends that the on-off status of the first carrier changes.

The on-off status of the first device on the first carrier may further be notified to all the receive ends by transmitting corresponding information by using the first carrier. Specifically, the receive ends may be notified, by using PDCCH or PUCCH or RRC signaling on the first carrier corresponding to a time when the on-off status on the first carrier changes, that the on-off status of the first carrier changes.

The second device provided in this embodiment of the present invention receives data that is transmitted by a first device by using a first carrier, where the first carrier is an unlicensed carrier; obtains status information of the first carrier, where the status information is used to determine whether the first carrier is available; and when the first carrier is unavailable, receives, by using a second carrier, the data retransmitted by the first device, where the first carrier and the second carrier are different carriers. This resolves a prior-art problem that when a device transmits data by using an unlicensed carrier, the data cannot be retransmitted because a channel needs to be preempted again.

Figure 7:
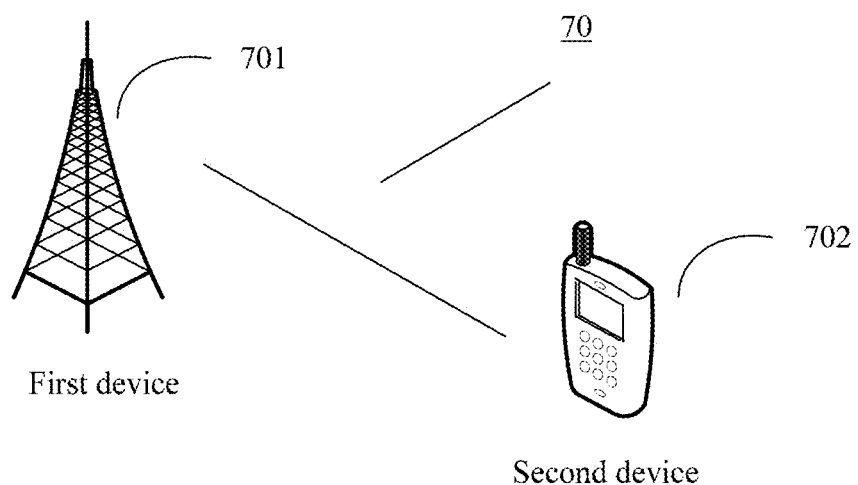
FIG. 7 is a schematic structural diagram of a wireless communications system according to an embodiment of the present invention.

Based on the foregoing embodiments corresponding to FIG. 1 and FIG. 2, an embodiment of the present invention provides a wireless communications system, configured to execute the data retransmission method described in the foregoing embodiments corresponding to FIG. 1 and FIG. 2. Preferably, the system is applied to an LAA-LTE system or an LTE system. Referring to FIG. 7, the wireless communications system 70 includes a first device 701 and a second device 702.

The first device 701 is the first device described in the embodiments corresponding to FIG. 3, and the second device 702 is the first device described in the embodiments corresponding to FIG. 4.

Alternatively, the first device 701 is the first device described in the embodiments corresponding to FIG. 5, and the second device 702 is the first device described in the embodiments corresponding to FIG. 6.

Preferably, the first device may be a base station, and the second device may be user equipment. Alternatively, the first device is user equipment, and the second device is a base station.

In the wireless communications system provided in this embodiment of the present invention, a first device transmits data to a second device by using a first carrier, where the first carrier is an unlicensed carrier. The first device obtains status information of the first carrier, where the status information is used to determine whether the first carrier is available. When the first carrier is unavailable, the first device retransmits the data to the second device by using a second carrier, where the first carrier and the second carrier are different carriers. This resolves a prior-art problem that when a device transmits data by using an unlicensed carrier, the data cannot be retransmitted because a channel needs to be preempted again.

In addition, a computer readable medium (or medium) is further provided, including a computer readable instruction that performs the following operations when the medium is executed: performing the operations of steps 101 to 103 or of steps 201 to 203 in the method of the foregoing embodiments.

In addition, a computer program product is further provided, including the foregoing computer readable medium.

It should be noted that signaling mentioned in this specification includes, but is not limited to, an indication, information, a signal, or a message. This is not limited herein.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data retransmission method, comprising:
   transmitting, by a first device, data to a second device using a first carrier, wherein the first carrier is an unlicensed carrier;
   obtaining, by the first device, status information of the first carrier, wherein the status information is used to determine whether the first carrier is available; and
   when the first carrier is unavailable, retransmitting, by the first device, the data to the second device using a second carrier, wherein the first carrier and the second carrier are different carriers.

2. The method according to claim 1, further comprising:
   sending, by the first device, control signaling to the second device, wherein the control signaling is used to indicate the data.

3. The method according to claim 2, wherein the sending, by the first device, control signaling to the second device comprises:
   sending, by the first device, the control signaling to the second device using the second carrier.

4. The method according to claim 2, wherein:
   the control signaling comprises a carrier indicator field (CIF), wherein the carrier indicator field is used to indicate the data.

5. The method according to claim 1, wherein the obtaining, by the first device, status information of the first carrier comprises:
   obtaining, by the first device, the status information of the first carrier by at least one of: by actively obtaining the status information by the first device, by using the second device, by using a third-party device, and by using preconfigured information.

6. The method according to claim 1, further comprising:
   sending, by the first device, the status information of the first carrier to the second device.

7. The method according to claim 6, wherein the sending, by the first device, the status information of the first carrier to the second device comprises:
   sending, by the first device, the status information of the first carrier to the second device using one of the first carrier and the second carrier.

8. The method according to claim 1, wherein:
   the second carrier is one of a licensed carrier and an unlicensed carrier.

9. A data retransmission method, comprising:
   receiving, by a second device, data that is transmitted by a first device using a first carrier, wherein the first carrier is an unlicensed carrier;
   obtaining, by the second device, status information of the first carrier, wherein the status information is used to determine whether the first carrier is available; and
   when the first carrier is unavailable, receiving, by the second device using a second carrier, the data retransmitted by the first device, wherein the first carrier and the second carrier are different carriers.

10. The method according to claim 9, further comprising:
    receiving, by the second device, control signaling sent by the first device, wherein the control signaling is used to indicate the data.

11. The method according to claim 10, wherein the receiving, by the second device, control signaling sent by the first device comprises:
    receiving, by the second device using the second carrier, the control signaling sent by the first device.

12. The method according to claim 10, wherein:
the control signaling comprises a carrier indicator field (CIF), wherein the carrier indicator field is used to indicate the data.

13. The method according to claim 9, wherein the obtaining, by the second device, status information of the first carrier comprises:
obtaining, by the second device, the status information of the first carrier by at least one of: by actively obtaining the status information by the second device, by using the first device, by using a third-party device and by using preconfigured information.

14. The method according to claim 13, wherein the obtaining, by the second device, status information of the first carrier by using the first device comprises:
receiving, by the second device, the status information of the first carrier that is sent by the first device.

15. The method according to claim 14, wherein the receiving, by the second device, the status information the first carrier that is sent by the first device comprises:
receiving, by the second device using one of the first carrier and the second carrier, the status information of the first carrier that is sent by the first device.

16. The method according to claim 9, wherein:
the second carrier is one of a licensed carrier and an unlicensed carrier.

17. A first device, comprising:
a processor; and
a non-transitory computer-readable storage medium including computer-executable instructions executed by the processor to perform, a method on the first device, the instructions comprising:
transmitting data to a second device using a first carrier, wherein the first carrier is an unlicensed carrier;
obtaining status information of the first carrier, wherein the status information is used to determine whether the first carrier is available; and
retransmitting, when the first carrier is unavailable, the data to the second device using a second carrier, wherein the first carrier and the second carrier are different carriers.

18. The device according to claim 17, the instructions further comprising:
sending control signaling to the second device, wherein the control signaling is used to indicate the data.

19. The device according to claim 17, the instructions further comprising:
obtaining the status information of the first carrier by at least one of: by actively obtaining the status information by the second device, by using the first device, by using a third-party device, and by using preconfigured information.

20. A second device, comprising:
a processor; and
a non-transitory computer-readable storage medium including computer-executable instructions executed by the processor to perform, a method on the second device, the instructions comprising:
receiving data that is transmitted by a first device using a first carrier, wherein the first carrier is an unlicensed carrier;
obtaining status information of the first carrier, wherein the status information is used to determine whether the first carrier is available; and
receiving, when the first carrier is unavailable, by using a second carrier, the data retransmitted by the first device, wherein the first carrier and the second carrier are different carriers.

* * * * *